US008186483B2

(12) United States Patent
Sirigu et al.

(10) Patent No.: US 8,186,483 B2
(45) Date of Patent: May 29, 2012

(54) ELEVATOR BRAKING DEVICE

(75) Inventors: Gerard Sirigu, Gien (FR); Nicholas Fonteneau, Germigny des Pres (FR)

(73) Assignee: Otis Elevator Company, Farmington, CT (US)

( * ) Notice: Subject to any disclaimer, the term of this patent is extended or adjusted under 35 U.S.C. 154(b) by 418 days.

(21) Appl. No.: 12/445,740

(22) PCT Filed: Nov. 8, 2006

(86) PCT No.: PCT/US2006/060636

§ 371 (c)(1),
(2), (4) Date: Apr. 16, 2009

(87) PCT Pub. No.: WO2008/057116

PCT Pub. Date: May 15, 2008

(65) Prior Publication Data

US 2011/0088983 A1 Apr. 21, 2011

(51) Int. Cl.

| | |
|---|---|
| ***B66B 5/12*** | (2006.01) |
| ***B66B 5/04*** | (2006.01) |
| ***B66B 5/02*** | (2006.01) |
| ***B66B 5/16*** | (2006.01) |
| ***B61H 7/00*** | (2006.01) |
| ***B60L 7/00*** | (2006.01) |

(52) U.S. Cl. ........ 187/366; 187/372; 187/373; 187/288; 187/359; 188/71; 188/158; 188/163

(58) Field of Classification Search .................. 187/366, 187/371–376, 288, 305, 359, 300; 188/41–44, 188/72.2, 136, 180, 189, 158, 161, 163; *B66B 05/06, B66B 05/18, 05/22*

See application file for complete search history.

(56) References Cited

U.S. PATENT DOCUMENTS

| | | | | |
|---|---|---|---|---|
| 4,176,826 A * | 12/1979 | Gray et al. | .................... | 188/189 |
| 5,096,020 A * | 3/1992 | Korhonen | .................... | 187/376 |
| 5,159,995 A * | 11/1992 | Sissala et al. | .................... | 187/376 |
| 5,363,942 A * | 11/1994 | Osada | .................... | 187/376 |
| 6,161,653 A | 12/2000 | Skalski et al. | | |
| 6,173,813 B1 * | 1/2001 | Rebillard et al. | .................... | 187/287 |
| 6,802,402 B2 * | 10/2004 | Bausch et al. | .................... | 188/171 |

(Continued)

FOREIGN PATENT DOCUMENTS

EP 0543154 A1 5/1993

(Continued)

OTHER PUBLICATIONS

International Search Report and Written Opinion for International application No. PCT/US2006/060636 mailed Jul. 20, 2007.
International Preliminary Report on Patentability for International application No. PCT/US2006/060636 mailed Feb. 16, 2009.

*Primary Examiner* — William E Dondero
*Assistant Examiner* — Minh Truong
(74) *Attorney, Agent, or Firm* — Carlson, Gaskey & Olds PC

(57) ABSTRACT

An elevator assembly (20) includes braking devices (30) for controlling movement of an elevator car (22). A braking device (30) includes an electrical actuator (62) for controlling relative movement between a carriage (42) and a base (40) that is mountable on the elevator car (22). Relative movement between the carriage (42) and the base (40) results in at least one braking member (46) following a surface (60) on the base (40) for movement between a released position and a braking position.

14 Claims, 2 Drawing Sheets

U.S. PATENT DOCUMENTS

| | | | | |
|---|---|---|---|---|
| 7,097,003 | B2 * | 8/2006 | Reynolds et al. | 187/351 |
| 7,131,517 | B1 * | 11/2006 | de Asis Mateo Mur | 187/370 |
| 7,398,863 | B2 * | 7/2008 | Liebetrau et al. | 187/367 |
| 7,650,969 | B2 * | 1/2010 | Monzon et al. | 187/300 |
| 2003/0085078 | A1 * | 5/2003 | Simmonds et al. | 187/373 |
| 2004/0262091 | A1 * | 12/2004 | Ito | 187/372 |

FOREIGN PATENT DOCUMENTS

| | | | |
|---|---|---|---|
| EP | 1400476 | A1 | 3/2004 |
| EP | 1604935 | A1 | 12/2005 |
| WO | 2005044709 | A1 | 5/2005 |
| WO | 2006077243 | A1 | 7/2006 |

* cited by examiner

ELEVATOR BRAKING DEVICE

BACKGROUND

This invention generally relates to elevators. More particularly, this invention relates to braking devices for elevators.

Elevator systems typically include safety braking devices to protect against overspeed conditions. Conventionally, safety governors include a governor wheel located near the top of a hoistway, a governor rope and a tension pulley in a hoistway pit. The governor rope is connected to a mechanical linkage that is supported on the elevator car. In the event of an overspeed condition, the governor wheel stops rotating. This prevents further movement of the governor rope. Any further movement of the elevator car causes the linkage to be pulled upon by the stationary governor rope. Movement of the linkage activates safety braking devices in a known manner.

While such arrangements have proven useful, they are not without limitations. One drawback associated with conventional arrangements is that the governor rope is typically provided on one side of an elevator car such that a linkage is utilized to activate safety braking devices on both sides of the car.

Recent developments in elevator systems make it desirable to introduce new approaches. For example, conventional safety governor arrangements take up space in the hoistway because there must be a certain amount of space allocated to the governor wheel and the tension pulley, for example. The use of machine roomless elevators includes the desire to reduce hoistway dimensions as much as possible. This requires reducing the volume occupied by the various components in the hoistway as much as possible. At the same time, the safety functions provided by an overspeed governor should be maintained.

One improvement in this area is disclosed in U.S. Pat. No. 6,161,653, which discloses a ropeless governor mechanism for an elevator car that relies upon electrically-based activation of the safety device.

This invention provides another arrangement for preventing undesired movement of an elevator car.

SUMMARY

An embodiment addresses an assembly for controlling movement of an elevator car. The assembly includes, among other possible things, a base, a carriage, at least one brake member, and an electric actuator. The base is mountable for movement with the elevator car. The carriage is supported by the base and is moveable relative to the base. The at least one brake member is coupled with the carriage and is moveable along a surface on the base between a released position and a braking position. The electric actuator is configured to selectively cause a relative movement between the base and the carriage to cause the at least one brake member to move between the released position and, the braking position.

Another embodiment addresses a method of controlling movement of an elevator car. This method includes, among other possible steps: stopping the elevator car in a desired position using a brake associated with an elevator machine; and applying a supplementary brake member supported on the elevator car, using an electrical actuator, to prevent undesired movement of the elevator car from the desired position.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described as follows.

DETAILED DESCRIPTION

Figure 1:
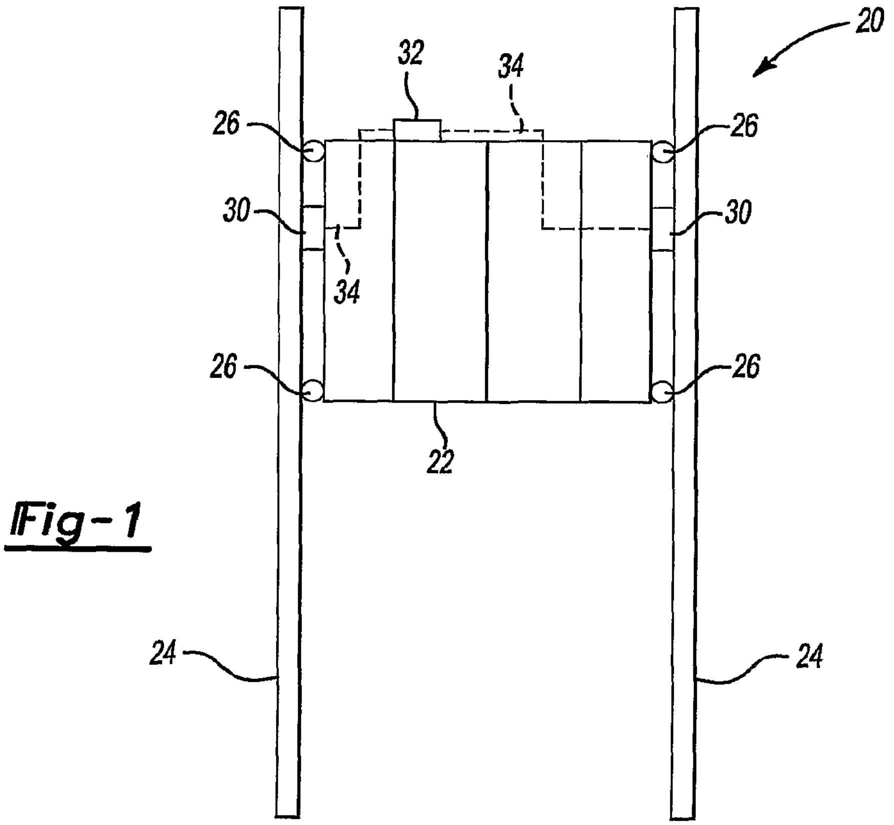
FIG. 1 schematically illustrates selected portions of an embodiment of an elevator system.

Efforts have been made throughout the drawings to use the same or similar reference numerals for the same or similar components.

Disclosed exemplary embodiments are useful for controlling movement of an elevator car. An electrical actuator is controlled to apply a braking force to prevent undesired movement of an elevator car. The disclosed embodiments are useful in a variety of situations including when there is an elevator overspeed condition, when a stopped elevator car is at a desired position and when there is an unexpected movement of an elevator car.

FIG. 1 schematically illustrates selected portions of an embodiment of an assembly 20 including an elevator car 22 and guide rails 24 positioned within a hoistway, for example, in a known manner. A plurality of guide roller devices 26 facilitate movement of the elevator car 22 along the guide rails 24 in a known manner.

Braking devices 30 are supported for movement with the elevator car 22 for selectively engaging a blade portion of the guide rails 24 to prevent undesired movement of the elevator car 22 in a variety of situations. A controller 32 determines when a condition exists in which it is desired to control an electrical actuator to apply the braking devices 30. A link schematically shown at 34 between the controller 32 and, each of the braking devices 30 allows the controller 32 to selectively control application of a braking force by the braking devices 30. The link 34 in one embodiment includes a hard-wired connection between the controller 32 and a corresponding portion of the braking devices 30. In another embodiment, the link 34 includes wireless signal transmission.

Figure 2:
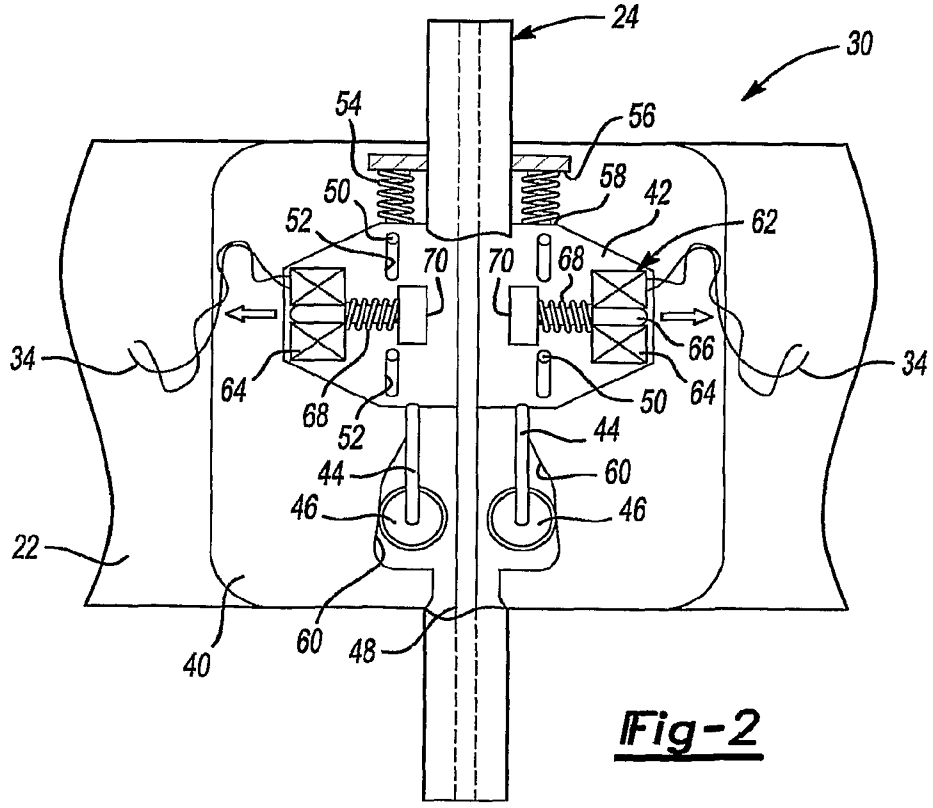
FIG. 2 schematically illustrates an embodiment of an assembly that is useful for controlling movement of an elevator car.

FIG. 2 schematically illustrates an embodiment of an arrangement in which the braking device 30 includes a base 40 that is mountable on an appropriate portion of the elevator car 22 such as a car frame member. The base 40 remains stationary relative to the elevator car 22 and moves vertically with the elevator car 22. A carriage 42 is supported on, and moveable relative to, the base 40.

At least one link 44 couples at least one brake member 46 to the carriage 42. In this embodiment, there are two links 44 and two brake members 46. In the illustrated embodiment, the brake members 46 comprise rollers that are situated for engaging a blade portion 48 on the guide rail 24. Wedge-style brake members are used in another embodiment.

The illustrated base 40 includes a plurality of locators 50 that are received within receivers 52 on the carriage 42. In the illustrated embodiment, the locators 50 comprise posts and the receivers comprise slots. A biasing member 54 biases the carriage 42 into a position in which the locators 50 are received against one end of the corresponding receivers 52. In the drawing, the bias of the biasing member 54 urges the carriage 42 in a downward direction. In the illustrated embodiment, the basing member 54 comprises a spring that reacts against a surface 56 that remains fixed relative to the base 40 and against a reaction surface 58 on the carriage 42 to urge them away from each other.

The illustrated, base 40 includes at least one surface 60 that controls a position of the braking members 46 relative to the blade portion 48 of the guide rail 24. In the position of FIG. 2, the braking members 46 are able to contact the blade portion 48 and roll along that portion during elevator car movement. The bias of the biasing member 54 maintains the carriage 42 in a position to keep the brake members 46 in a released position where they do not apply a braking force to the blade portion 48 of the guide rail 24.

Under selected conditions, it is desirable to apply a braking force using the braking members 46. The controller 32 is programmed to determine when there is such a condition. If so, the controller 32 activates an electric actuator 62 for applying a braking force using the braking members 46. In this embodiment, the electric actuator 62 comprises two coils 64 that receive electrical power through the link 34, which in this embodiment includes a hardwired connection to a source of power. A post 66 is normally biased toward the blade portion 48 by a spring 68. When the coils 64 are energized, the posts 66 are retracted in a direction away from the blade portion 48 as schematically shown by the arrows in FIG. 2. In this position, stop members 70, which comprise brake linings in one embodiment, arc held away from contact with the blade portion 48.

Figure 3:
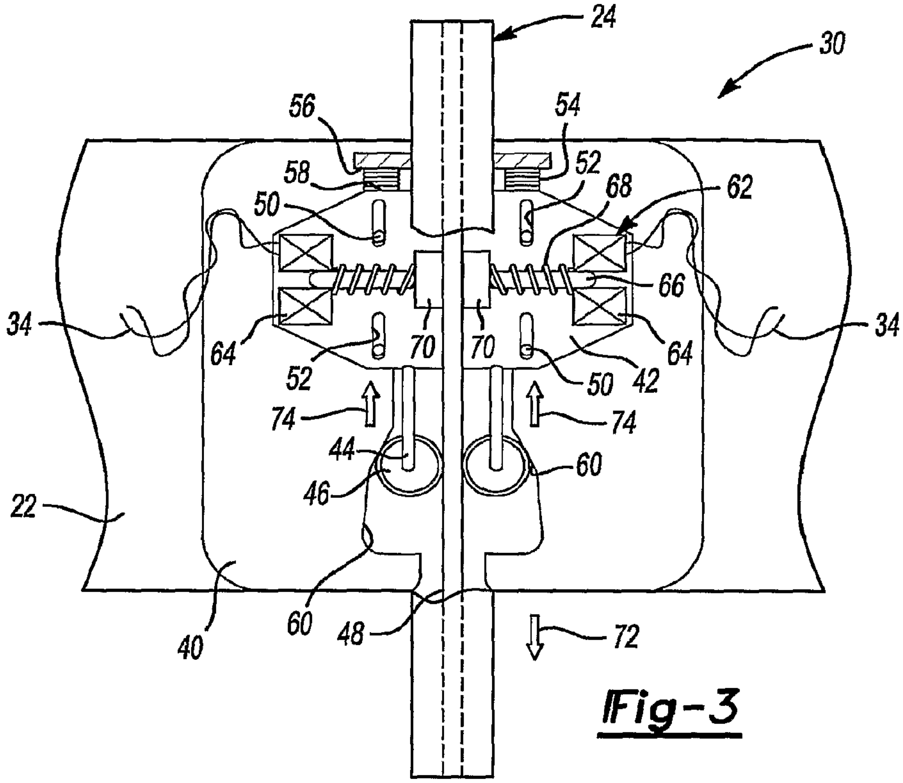
FIG. 3 schematically illustrates the embodiment of FIG. 2 in another operating condition.

In the event that the controller 32 determines it is desirable to control movement of the elevator car 22 using the braking devices 30, the controller 32 controls activation of the coils 64 to allow the springs 68 to urge the stop members 70 into engagement with the blade portion 48 of the guide rail 24. This condition is shown in. FIG. 3, for example. By de-energizing the coils 64 in one embodiment, the stop members 70 are urged into engagement with the brake portion 48. Any movement of the elevator car 22 in this condition, as schematically shown by the arrow 72, results in relative movement between the base 40 and the carriage 42. The elevator car 22 and base 40 move relative to the guide rail 24. The stop members 70 prevent the carriage 42 from moving relative to the guide rail 24. This relative movement overcomes the bias of the biasing member 54 and results in. the brake members 46 following the contour of the surface 60 on the base 40 such that the brake members 46 move into a braking position as shown in FIG. 3. In this embodiment, the brake members 46 become wedged between the base 40 and the blade portion 48 of the guide rail 24. This results in applying a braking force that prevents further movement of the elevator car 22.

Once the controller 32 determines that it is no longer desired to apply a braking force using the braking devices 30, the controller 32 appropriately controls the electrical actuator 62 (e.g., re-energizes the coils 64) and the brake members 46 are returned to a released position by application of the biasing force of the biasing member 54.

The embodiment of FIGS. 2 and 3 is useful for controlling movement of an elevator car in one direction. For controlling movement in more than one direction, another device like that shown in FIGS. 2 and 3 could be installed in a reversed orientation.

Figure 4:
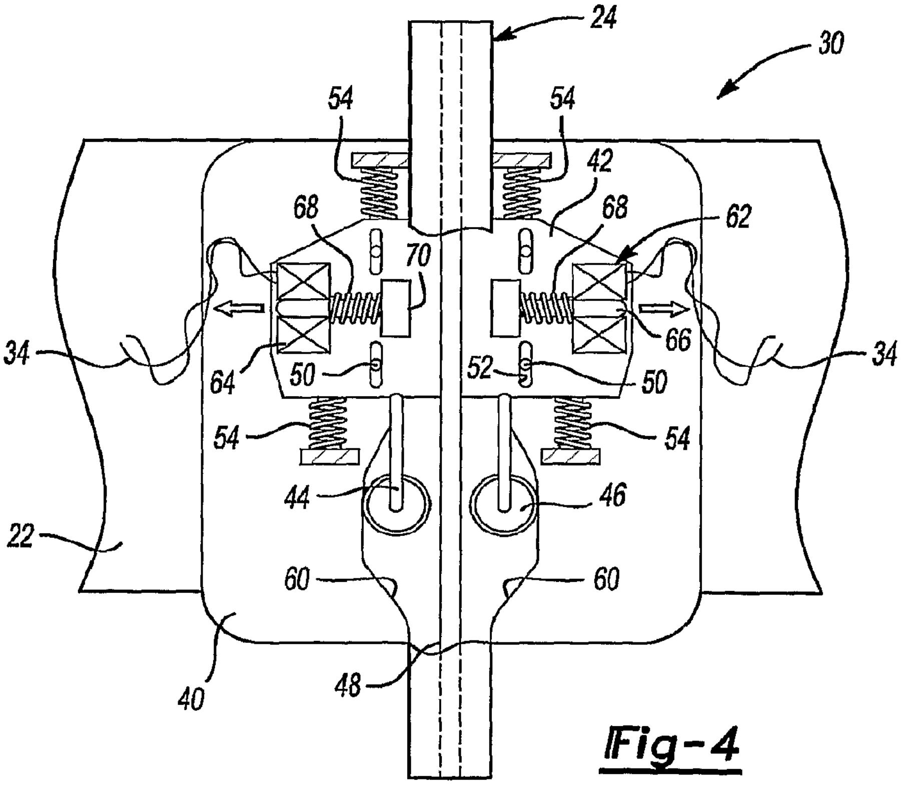
FIG. 4 schematically illustrates another embodiment of an assembly that is useful for controlling movement of an elevator car in more than one direction.

FIG. 4 shows another embodiment of a braking device 30 that is useful for controlling movement of an elevator car in more than one direction. In. this embodiment, the locators 50 associated with the base 40 are at least partially received within receivers 52 on the carriage 42. Biasing members 54 in this embodiment bias the carriage 42 into a position in which the locators 50 are near a center of a range of movement relative to the corresponding receivers 52.

The embodiment of FIG. 4 shows the stop members 70 retracted away from the blade portion 48 by operation of the electrical actuator 62. The brake members 46 are shown in a released position. In the event that a braking force from the device 30 of FIG. 4 is desired, the electrical actuator 62 releases the rods 66 and stop members 70 to engage the blade portion 48. If the elevator car 22 then moves in either direction (e.g., up or down in the drawing), the brake members 46 follow the contour of the surface 60 on the base 40 into a braking position. Subsequently releasing the stop member 70 from the blade portion 48 by energizing the coils 64, for example, will result in the biasing members 54 urging the brake members 46 into the released position shown in FIG. 4 so that further movement of the elevator car 22 is possible as desired.

The illustrated braking device embodiments are useful for controlling movement of an elevator car and applying a braking force to prevent an overspeed condition, unexpected or undesired movement of an elevator car in a manner that provides the functions of an elevator safety governor device. The controller 32 obtains information from known devices or techniques for determining when such a condition exists. Given this description, those skilled in the art will realize how to configure or program a controller for that purpose according to their particular needs.

The illustrated embodiments are also useful for another type of control of elevator car movement. When an elevator car is stopped in a desired position at a landing, the controller 32 controls the electrical actuator 62 to apply the stop members 70 to the blade portion 48. In the event that the load on the elevator car changes significantly such that there would be so-called rope stretch or a perceived bouncing of the elevator car relative to the landing, the braking device embodiments operate to prevent such movement of the elevator car relative to the landing outside of a desired range. The contour of the surfaces 60 and the sizes of the components selected for the braking devices 30 may set an acceptable range of movement of the elevator car when it is otherwise stopped using a brake associated with the elevator machine as known. Accordingly, the braking device embodiments provide additional elevator car movement control compared to previous governor arrangements.

With traditional governor arrangements, the governor rope would have to move at a high speed to trigger the centrifugal action of the governor wheel to result in activation of the associated safeties. The relatively slight movement of an elevator car at a landing during loading or unloading, for example, is not sufficient enough to trigger activation of traditional governor wheels or safeties. The illustrated embodiments, however, can be controlled in a manner that facilitates preventing such movement of an elevator car under such circumstances.

In one embodiment, the controller 32 is programmed with a variety of conditions for selectively controlling the electrical actuator 62 for controlling the application of a braking force using the braking devices 30. Given this description, those skilled in the art will realize how to configure or program a controller and what type of software, hardware, firmware or combination of these will best meet the needs of their particular situation.

One advantage of the disclosed embodiments is that the application of a braking force can be synchronized on both sides of an elevator car for simultaneously applying a braking force to each of the guide rails 24. This provides better elevator performance and reduces the likelihood for any damage or deformation to elevator system components. Moreover, the arrangement does not require a mechanical linkage between the braking devices 30. This eliminates components from an elevator system that provides cost advantages and introduces economies into the elevator installation process. Additionally, the elimination of mechanical linkages for attempting to synchronize safeties reduces the dimensions of components required within the hoistway to allow for further reducing the space occupied by an elevator system.

Another advantage to the disclosed embodiments is that the stop members 70 need not apply a large force against the blade portion 48 to achieve activation of the braking device 30. In one embodiment, only approximately two percent of the braking force used to stop an elevator car is applied when the springs 68 urge the stop members 70 against the blade portion 48. This provides the advantage of allowing for lower cost components to be used and reduces the likelihood of any deformation or damage to the surfaces on the blade portion 48. This enhances the useful life of the guide rails 24 and facilitates improved elevator system operation.

Additionally, the low power required by the disclosed embodiments allows for battery powered operation of the electrical actuator 62, which can be useful in situations in which a normal power source becomes unavailable (e.g., a power failure).

Further advantages of the described embodiments include: (a) eliminating the need to adjust, both in the factory and in the hoistway, the parts associated with conventional mechanical applications; (b) enabling electronic monitoring of the assemblies, which may occur remotely via a wired or wireless connection to the assemblies; (c) reducing costs associated with manufacturing and installing the number parts used in conventional mechanical applications; (d) reducing the likelihood of car movement while the doors are open; (e) reducing the overall weight of the car; (f) increasing hoistway efficiency; and (g) providing assemblies that are configured to interface with Programmable Electronic components and Systems for Safety Related Applications on Lifts ("PESSRAL").

The preceding discussion is intended to be merely illustrative and should not be construed as limiting the appended claims to any particular embodiment or group of embodiments. Thus, while specific exemplary embodiments have been described, it should also be appreciated that numerous modifications and changes may be made without departing from the broader and intended scope of the invention as set forth in the claims that follow. The specification and drawings are accordingly to be regarded in an illustrative manner and are not intended to limit the scope of the appended claims. In light of the foregoing disclosure of the present invention, one versed in the art would appreciate that there may be other embodiments and modifications within the scope of the present invention. Accordingly, all modifications attainable by one versed in the art from the present disclosure within the scope of the present invention are to be included as further embodiments of the present invention. The scope of the present invention is to be defined as set forth in the following claims

We claim:

1. An assembly for controlling movement of an elevator car, comprising:

a base that is mountable for movement with an elevator car;

a carriage supported by the base such that the carriage is moveable relative to the base;

at least one stop member configured to engage a stationary surface in a hoistway;

at least one brake member coupled with the carriage and moveable along a surface on the base between a released position and a braking position; and an electric actuator that is configured to selectively cause the at least one stop member to engage the stationary surface to thereby prevent the carriage from moving relative to the stationary surface sufficiently to cause a relative movement between the base and the carriage to cause the at least one brake member to move between the released position and the braking position, wherein the carriage is spring biased into a position corresponding to the released position.

2. The assembly of claim 1, comprising:

at least one spring that is configured to bias the carriage into the position corresponding to the released position.

3. The assembly of claim 1, wherein the electric actuator includes a portion that supports the at least one stop member.

4. The assembly of claim 1, wherein the electric actuator comprises:

a coil; and a rod that is configured to be biased into a position to allow relative movement between the base and the carriage, the at least one stop member being near an end of the rod; and wherein the coil is configured to be selectively energized to hold the rod and the stop member in the position to allow the relative movement between the base and the carriage.

5. The assembly of claim 4, comprising:

a spring that is configured to bias the stop member toward the stationary surface.

6. The assembly of claim 1, wherein the at least one brake member is configured to be wedged between the surface on the base and the stationary surface in the hoistway when the at least one brake member is in the braking position.

7. The assembly of claim 1, wherein the stationary surface comprises a guide rail surface, wherein the at least one stop member is configured to engage the guide rail surface to prevent the carriage from moving relative to the guide rail such that movement of the base relative to the guide rail causes the relative movement between the carriage and the base.

8. The assembly of claim 1, comprising:

another electrical actuator, each actuator being associated with a respective base, carriage, and brake member; and a controller that is configured to activate the electrical actuators to control a desired amount of synchronization when the brake members move into corresponding braking positions.

9. The assembly of claim 8, wherein the controller is configured to activate the plurality of electrical actuators simultaneously.

10. The assembly of claim 1, comprising:

a controller that is configured to control activation of the electric actuator to allow the at least one braking member to move into the braking position during an elevator overspeed condition.

11. The assembly of claim 1, comprising:

a controller that is configured to control activation of the electric actuator to allow the at least one braking member to move into the braking position when the elevator car is stopped at a desired position.

12. The assembly of claim 1, comprising:

a controller that is configured to control activation of the electric actuator to allow the at least one braking member to move into the braking position during an unexpected movement of the elevator car.

13. An assembly for controlling movement of an elevator car, comprising:

a base that is mountable for movement with an elevator car;

a carriage supported by the base such that the carriage is moveable relative to the base, wherein the base comprises a plurality of locators and the carriage comprises a plurality of receivers, and wherein the receivers are configured to cooperate with the locators to guide relative movement between the carriage and the base;

at least one stop member configured to engage a stationary surface in a hoistway;

at least one brake member coupled with the carriage and moveable along a surface on the base between a released position and a braking position; and an electric actuator that is configured to selectively cause the at least one stop member to engage the stationary surface to thereby prevent the carriage from moving relative to the stationary surface sufficiently to cause a relative movement between the base and the carriage to cause the at least one brake member to move between the released position and the braking position.

14. The assembly of claim 13, wherein the locators comprise posts and the receivers comprise slots.

* * * * *